Figure 1:
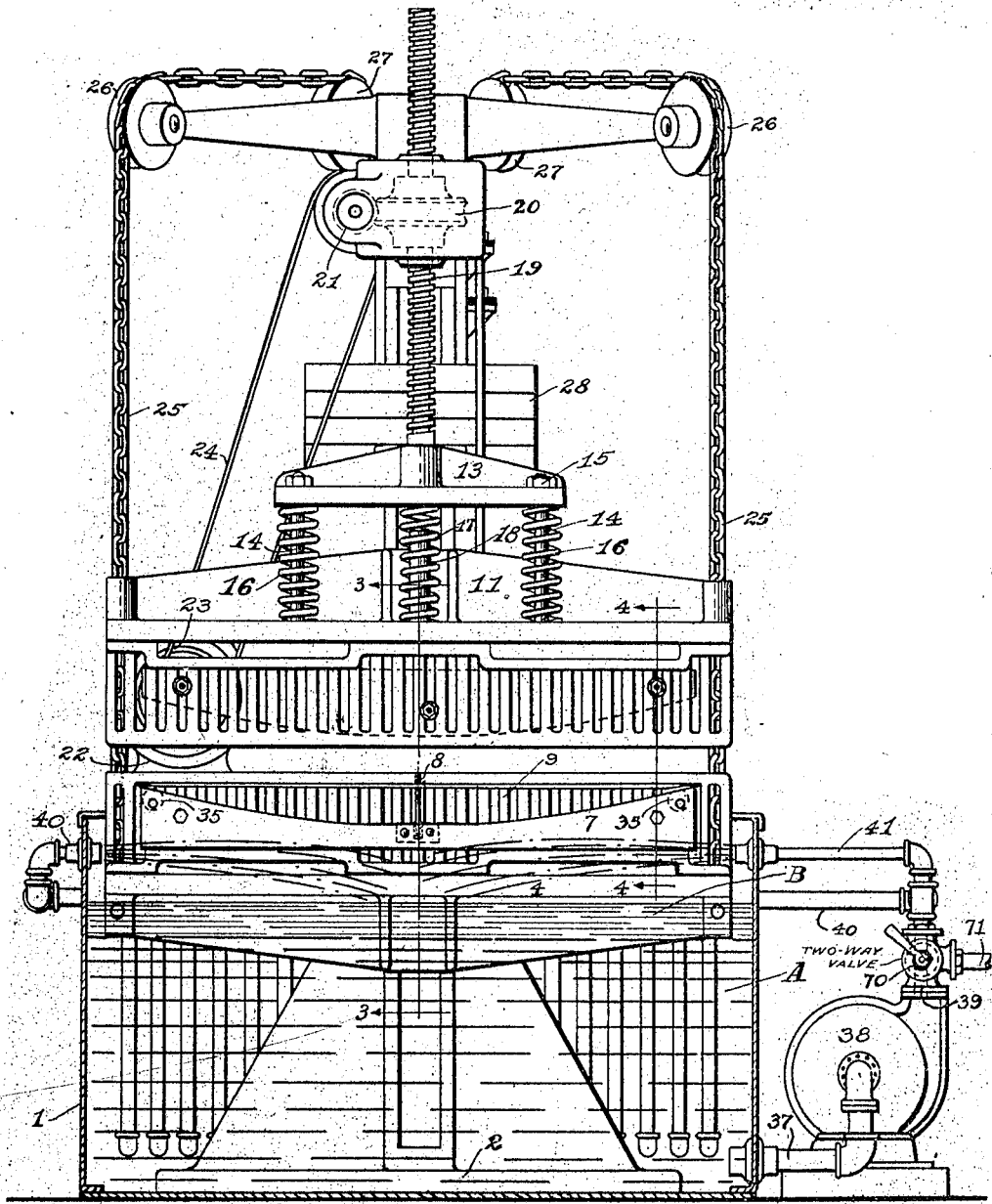

T. J. FAY.
APPARATUS FOR SHAPING AND TEMPERING METAL.
APPLICATION FILED AUG. 11, 1915.
1,298,682.
Patented Apr. 1, 1919.
4 SHEETS—SHEET 2.
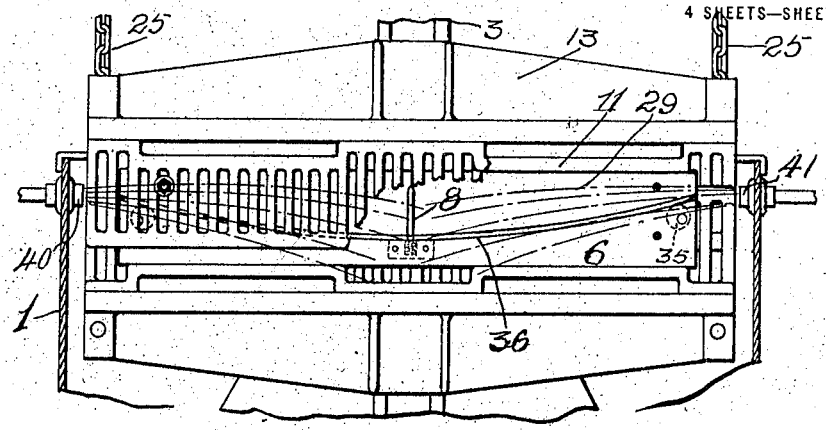
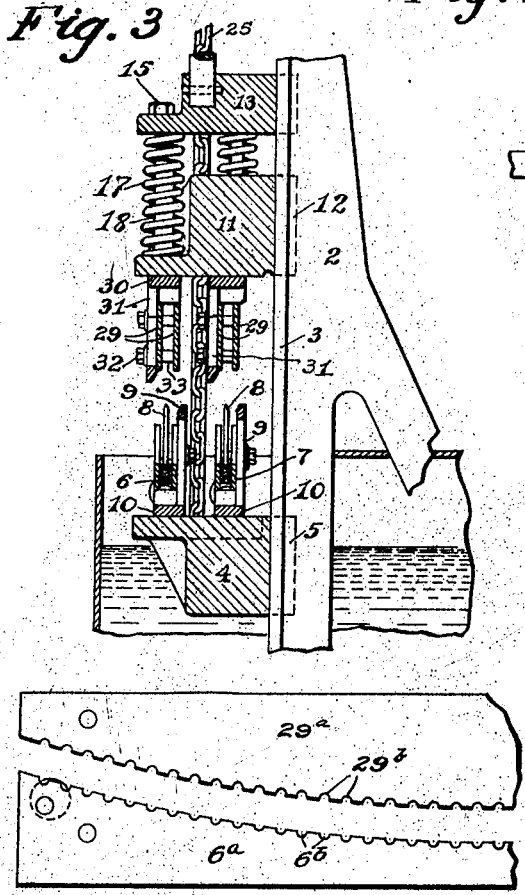
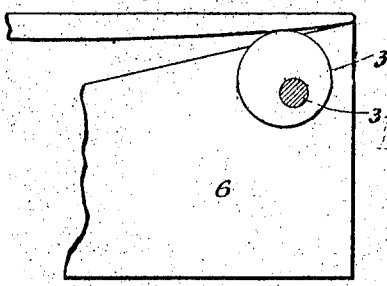
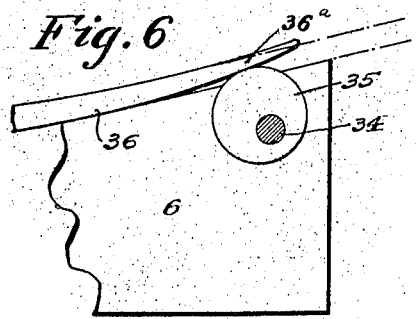
INVENTOR
Thomas J. Fay
BY Hull, Smith, Brock & West
ATTYS.

T. J. FAY.
APPARATUS FOR SHAPING AND TEMPERING METAL.
APPLICATION FILED AUG. 11, 1915.
1,298,682.
Patented Apr. 1, 1919.
4 SHEETS—SHEET 3.
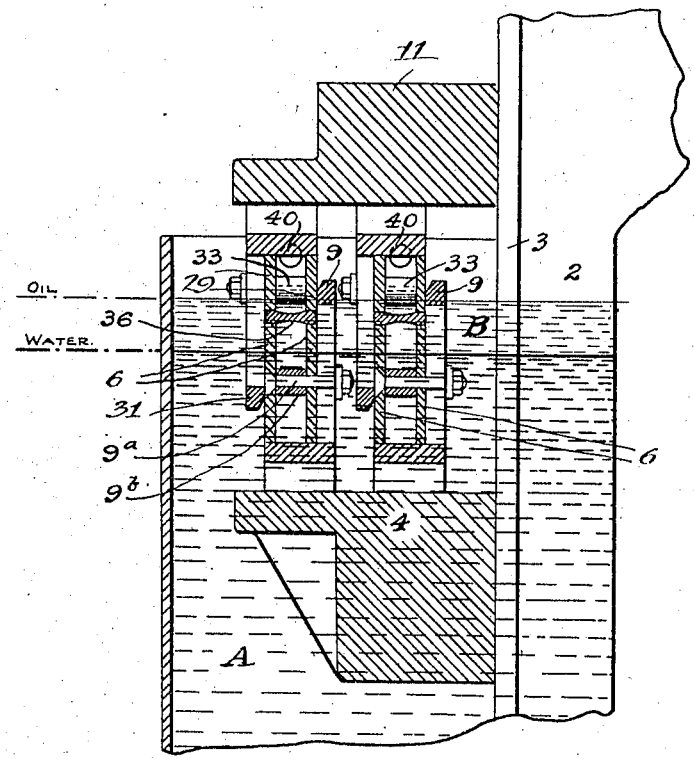
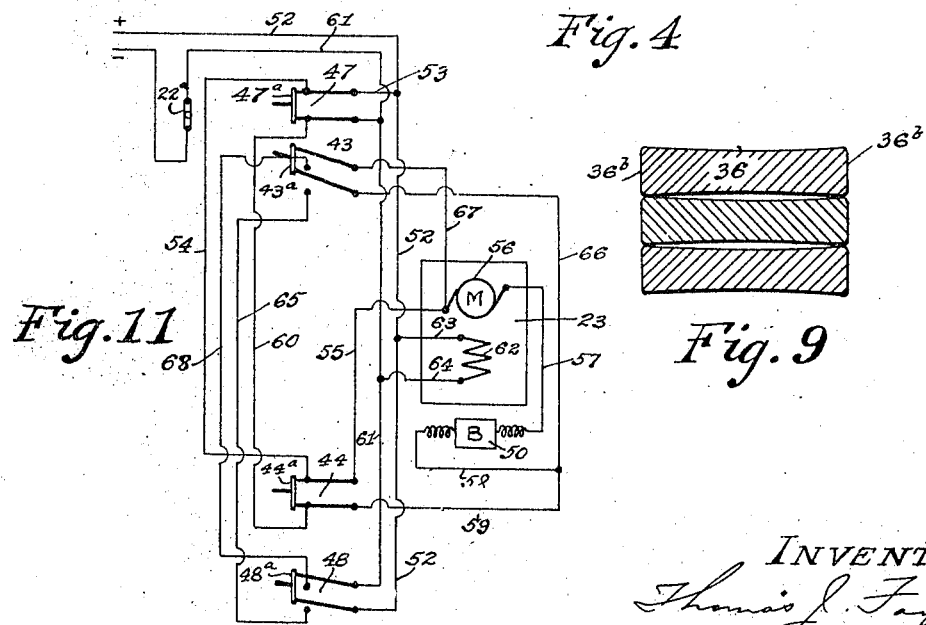
INVENTOR
Thomas J. Fay,
By Hull, Smith, Buck & West
ATTYS.

T. J. FAY.
APPARATUS FOR SHAPING AND TEMPERING METAL.
APPLICATION FILED AUG. 11, 1915.
1,298,682.
Patented Apr. 1, 1919.
4 SHEETS—SHEET 4.
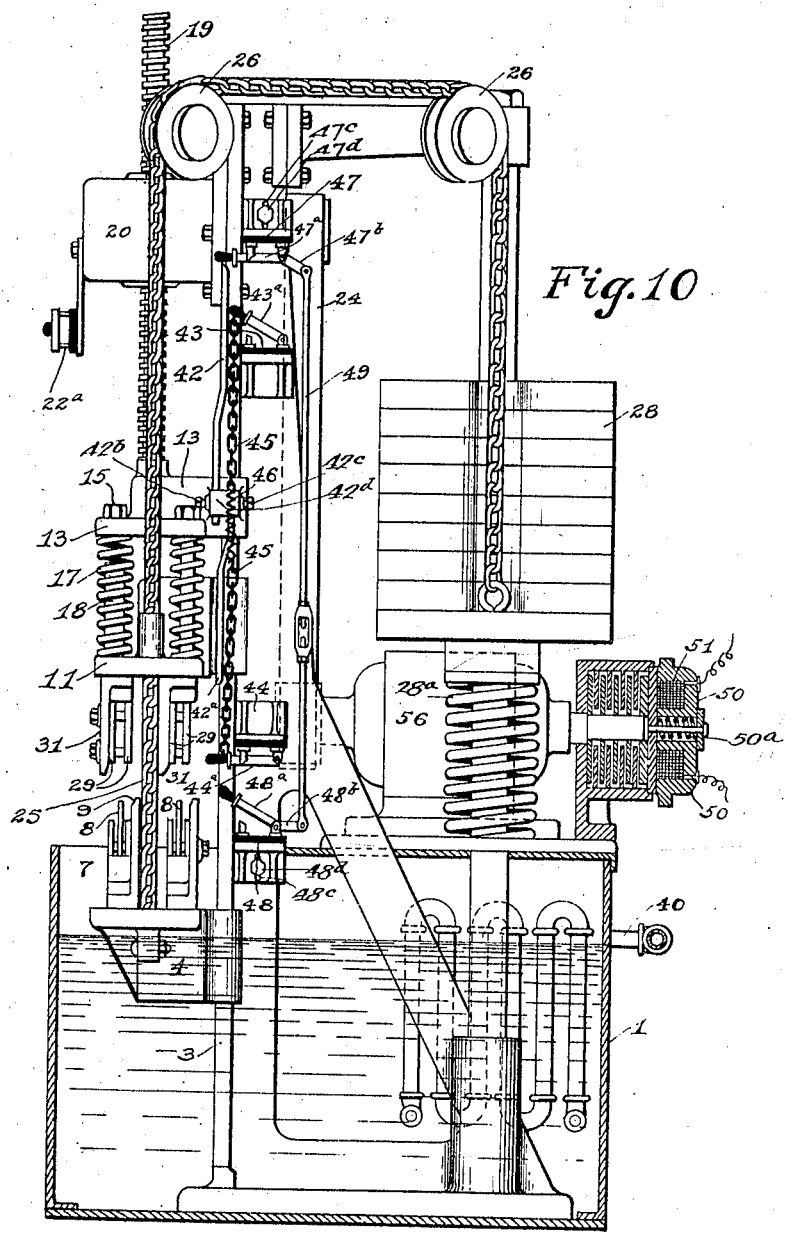
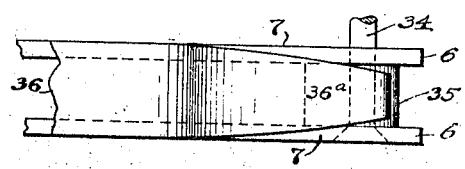

UNITED STATES PATENT OFFICE.

THOMAS J. FAY, OF BROOKLYN, NEW YORK, ASSIGNOR, BY MESNE ASSIGNMENTS, TO THE STANDARD PARTS COMPANY, OF CLEVELAND, OHIO, A CORPORATION OF OHIO.

APPARATUS FOR SHAPING AND TEMPERING METAL.

1,298,682.    Specification of Letters Patent.    Patented Apr. 1, 1919.

Application filed August 11, 1915. Serial No. 44,875.

*To all whom it may concern:*

Be it known that I, THOMAS J. FAY, a citizen of the United States, residing at Brooklyn, in the county of Kings and State of New York, have invented a certain new and useful Improvement in Apparatus for Shaping and Tempering Metal, of which the following is a full, clear, and exact description, reference being had to the accompanying drawings.

This invention relates to an apparatus for tempering and cambering metal, and has for its general object to insure uniformity in, and greatly improve the quality of, such metal; also to facilitate the handling of the same. Among the further and more limited objects of my invention is that of providing an apparatus whereby plates—such as used in spring construction—may be raised (and be required to be raised) in temperature to a point slightly above recalescence and may be quenched before the dropping below recalescence—the apparatus being so constructed and operated that the plate (or other article) to be tempered need be heated to a temperature of only about 75° F. beyond decalescence, and the operator will nevertheless have time to insert the plate into the shaping form and to carry this form into the quenching fluid before the plate has parted with this slight excess of temperature, thus submitting the plate to the quenching fluid in such time that the quenching effect will begin as closely to and above the point of recalescence as practicably possible to a skilled operator. An important step in the practice of my invention (and for the realization of which my apparatus is designed) is to so time the period through which the plates are subjected to the quenching fluid that the heat remaining in the core sections of the plates will be sufficient to temper the plates, thus permitting the core heat to "bloom" over the plates whereby the quenching fluid is dried or dispelled from the plates and the desired temper is produced in and throughout the latter; also, and very importantly, to perform this step without warping, or twisting, or producing irregularities in the cooled plates. As a means of accomplishing the objects above set forth, the cambering forms will be so fashioned as not only to offer no material obstacle to the withdrawal of the heat from the plates clamped therebetween during the quenching operation but, on the other hand, to withdraw practically no heat from such plates due to their contact therewith.

A further object of the invention is to make largely automatic the control of the time occupied for quenching and other operations of the apparatus. Still further objects of the invention will appear hereinafter; and, more generally stated, the invention may be defined as consisting of the combinations of elements embodied in the claims hereto annexed and illustrated in the drawings forming part hereof, wherein Figure 1 represents a front sectional elevation of a bending or cambering apparatus constructed in accordance with my invention and showing the table in its elevated position and the forms separated; Fig. 2 is a detail, partly in section and partly in elevation, showing the table partly lowered and the forms having a plate clamped therebetween and passing through the spraying zone; Fig. 3 is a central sectional detail corresponding substantially to the line 3—3 of Fig. 1; Fig. 4 a similar view corresponding to the line 4—4 of Fig. 1 and showing the cambering forms in closed position; Figs. 5 and 6 are details in elevation, and Fig. 7 a detail in plan, of one end of the lower cambering form, the grid being omitted and illustrating means whereby the tapered and reduced ends of the plate may be supported and given an extra curvature or camber; Fig. 8 a detail in elevation of a modified construction of cambering form; Fig. 9 a sectional view taken through a spring and illustrating the manner in which the plates are shaped by the rolling operation for the tempering and cambering operation; Fig. 10 a sectional side elevation of the machine shown in Fig. 1, and Fig. 11 a diagram of the electrical circuits involved.

Describing by reference characters the various parts illustrated herein, 1 denotes a tank and 2 a standard the base whereof is preferably located within and upon the bottom of the tank. At its front, the standard is fashioned into a T-beam, indicated at 3, whereby a guide is formed for the base member or table 4 on which the lower set of cambering templets or forms is supported, and this table is shown as provided with flanges 5 (see Fig. 3) which are adapted to embrace the lateral edges of the T-beam 3, whereby the base member or table may be guided in its vertical movement. The table forms a support for a suitable number—two being shown—of laterally spaced frames or templets each comprising a pair of vertically extending and laterally spaced plates 6 having each its upper edge concaved, as indicated at 7. Between each pair of plates 6 and at the central portion thereof, there is inserted a pin 8, which pin is adapted to receive the center hole of the spring plate which is to be cambered and tempered. At the rear of each pair of plates 6 there is located a grid 9, which assists in positioning the spring plates upon the upper edges of the plates 7 and which may be formed as part of a base 10 which supports the form plates.

Coöperating with the forms just described are the upper forms, which are supported by a cross head 11 which is mounted upon the T-beam 3 by means of the lateral flanges 12. This cross head 11 is supported from a head 13 thereabove by means of bolts 14 connected to the cross head and extending through the head 13 and provided with nuts 15, there being coiled springs 16 surrounding said bolts and interposed between the heads 11 and 13, whereby (under circumstances to be set forth hereinafter) a yielding pressure will be applied to the head 11 and to the head 13. The spring 17, interposed between the heads 11 and 13, assists in this yielding transmission of pressure, the spring 17 being mounted on a post 18, which, when the springs 14 and 17 have been compressed a certain distance, will be engaged by the head 13. For the purpose of operating the heads 11 and 13, a screw 19 is provided which is connected to the head 13, the screw having a nut 20 thereon provided with a worm gear on its outer surface meshing with a worm 21 which may be driven by any source of power, as by means of a motor, indicated generally at 22, the shaft on said motor having a pulley 23 which drives the worm 21, as by means of a belt 24, the circuit including this motor being controlled by a main switch 22ª. In order to counterbalance the weight of the table 4 and the lower cambering forms, said table is suspended by means of chains 25 connected thereto and extending over pulleys 26, 27 at the top of the machine and connected with a counterweight 28. The connections thus far described for moving the table and the cambering parts up and down are substantially identical with the parts shown, described and claimed in my application No. 857,522, filed August 19, 1914.

The counterweight 28 is composed of a number of separate weights whereby the pressure to which the plates are subjected between the cambering forms (to be described hereinafter) may be adjusted to the requirements of the particular grade and thickness or gage of steel that may be treated at any particular time. Beneath the counterweight there is a spring 28ª which forms a yielding support for the counterweight when the cambering forms have been opened to their full extent, as indicated in Fig. 10.

The head 11 is provided with a pair of upper cambering forms coöperating with the lower ones, each upper form comprising a pair of plates 29 each plate being preferably in the same vertical plane as the corresponding plate 6 therebeneath and the lower edges of the plate 29 being convex, the curvature being preferably the same as the curvature of the upper edges of the plates 6. The plates 29 of each form may be conveniently carried by a grid, the base 30 whereof may be fastened to the head 11, the fingers 31 of the grid being arranged in front of the plates 29. Bolts 32 are shown as connecting the plates 29 to their respective grids, said bolts being provided with spacing sleeves 33. The plates 6 are supported in like manner from the grids 9, the bolts connecting the plates to the grids being indicated at 9ª and the spacing sleeve thereon at 9ᵇ (see Fig. 4).

In Figs. 5, 6 and 7 I have shown means whereby the beveled or tapered ends of the spring plates may be supported during the cambering operation and may be given an increased curvature whereby they will grip the adjacent plates. The plates 6 support near their outer ends a shaft 34 having rigid therewith an eccentric 35. 36 denotes a spring plate, the beveled and tapered end 36ª whereof is shown as resting upon the roller 35. By adjusting the shaft 34, the ends 36ª of the plate 36 will be supporting during the forming operation and an additional curvature may be imparted thereto.

As in the case of my application hereinbefore referred to, it is proposed to clamp the heated plate to be quenched between the upper and lower parts of the form and to immerse the plate thus clamped in the liquid within the tank. The liquid in the tank may, and preferably will, consist of a lower body A of water with a body of oil B thereupon. At the bottom of the tank is a conduit 37 which communicates with a pump 38, the delivery pipe 39 whereof is branched, as indicated at 40 and 41, said branches being in turn branched and the branches extending through the closed wall of the tank, near the top thereof. The delivery ends of the branches 40 are opposed to the delivery ends of the branches 41 and are so arranged that each opposed pair of branches 40, 41 will discharge into the tank in substantially the vertical plane which is traversed by one of the cambering forms. Before the plates are inserted into the forms and the motor operated to cause the forms to be immersed, the parts will be supported with the tops of the form plates 6 slightly above the streams of liquid discharged through the branches 40 and 41. The plates to be cambered, having been heated to a temperature of say 75° beyond decalescence, are applied to the lower form members with the pins 8 extending through their centers and the edges of the spring plates resting upon the tops of the plates 6, the ends being supported by the eccentric 35. The motor 22 is then operated, causing the heads 11 and 13 to descend, the upper cambering plates 29 engaging the spring plates and bending them downwardly intermediate of the ends thereof, the blow of the upper cambering form upon the lower form being cushioned by the springs 16 and 17. The cambering forms then descend in unison, and the spring plates clamped therebetween have their upper and lower surfaces swept longitudinally by the streams of liquid discharged at high speed through the branches 40 and 41. The liquid discharged on the top and bottom of the plates serves to quench the outer surfaces of the plates, the meeting of the opposed streams facilitating the lateral distribution of the liquid over the plates. Furthermore, subjecting the heated plates to these rapidly moving streams results in wiping off any bubbles that may be formed thereupon—due to spheroidal action—and this prevents local differences in the temper and fiber of the plates.

The forms descend into the liquid within the tank, traveling to a depth determined by the speed of the machine, the location of the motor-reversing switch, the initial temperature of the plates, and the desired depth of the chilled and hardened exterior for the plate, with the view of initiating the quenching effect as closely above recalescence as skill will permit, while withdrawing the plate from the action of the quenching liquid in time to retain in the core of the plate a temperature sufficient to temper the plate in the manner referred to hereinbefore,—without danger of warping. This quenching of the metal—using one of the standard steels as an example—should be done so quickly as to lower the temperature in the surface section of the plate to about 400° F. while the temperature of the core section will be such that, when the plate is withdrawn from the bath, the residual heat in such section should be sufficient to produce a temperature of about 850° F. in the whole plate, the exterior chilled part of the plate being of such depth as to resist warping or twisting by the subsequent "blooming" or the heat from the central core.

The construction of the forms contributes to this end, since they are so shaped as to engage the edges of the plate in narrow lines of contact only, which prevents blanketing of the surfaces of the plates during the quenching operation and the material absorption of heat therefrom during the tempering operation. In operating upon a plate made from basic open hearth steel analyzing one hundred points carbon, it will be heated to about 1535° F., clamped, and quickly carried through the quenching operation so that, after withdrawal from the bath, the plate will be at a temperature of about 850° F. throughout. It will be understood that, if the particular steel employed requires some departure from the ranges mentioned, the apparatus disclosed herein may be very conveniently adjusted to accommodate these changes.

In Fig. 8 there is shown a modification of the cambering plates, indicated at 6$^a$ and 29$^a$ respectively, wherein the upper edges of the plates 6$^a$ are notched or recessed, as indicated at 6$^b$, while the lower edges of the plates 29$^a$ are notched or recessed, as indicated at 29$^b$, whereby the contact area between the forms and the spring plates clamped therebetween is reduced to a minimum.

In Fig. 9 I have shown a sectional view taken through three standard spring plates, as customarily furnished by the steel mills, and illustrating the concavity of the upper and lower surfaces thereof whereby the lateral portions 36$^b$ are thicker than the central portions of the plates. Clamping the lateral edge portions of the plates between the forms—see particularly Fig. 4—brings the pressure upon the thickest portions of the plates.

Reference has been made hereinbefore to the automatic control of the quenching period whereby the plates on the one hand will not be chilled to such an extent as to prevent them from having a final temperature which will secure the proper qualities—a temperature of 850° F. has been referred to as one which will secure these desirable qualities in the case of spring plates—and on the other hand will not interfere with the production of an external chilled area of sufficient extent to successfully resist warping due to the heating of the plate from the central heated area or core. There are shown in Figs. 10 and 11 connections whereby the above results may be accomplished. In these views 42, 42$^a$ denote a pair of rods or bars which are adjustably connected to the head 13 as by set screws 42$^b$, 42$^c$ securing said rods or bars in a boss 42$^d$ carried by said head. 43 and 44 denote upper and lower switches, respectively, supported from the frame of the machine and having their operating handles in the path of the aforesaid rods or bars 42, 42$^a$. The handles of these switches are shown as yieldingly connected by chains 45 having interposed therebetween a spring 46, the spring tending to maintain the switches closed. Above the switch 43 is located a switch 47 that is also supported from the frame of the machine and in such manner as to be adjustable toward and from the switch 43. It will be observed that the blade 47a of this switch opens in a reverse direction from that of the blade of switch 43 and that the operating handle of this switch is arranged to be engaged by the end of the upper rod 42. Arranged in identically the same manner as above described, there is a switch 48 adjustably supported below the switch 44 and having the handle of its blade 48a in position to be engaged by the end of the lower rod 42a. The blades of the switches 47 and 48 are extended beyond their pivotal points, and these extensions project in a direction opposite to their operating handles: these extensions (47b and 48b) are positively connected by the link 49, said link including a turn buckle for the obvious purpose of adjustment. The adjustability of the switch 47 may be conveniently secured by means of a slot 47c formed in the switch block and through which there extends a set screw 47d; a similar slot 48c and set screw 48d may be employed with the block of the switch 48 for the purpose of rendering it adjustable. From this it will be seen that when one of the switches 47 or 48 is closed, the other will be opened by reason of the aforesaid connection. A magnetic brake 50 is shown as applied to the rear end of the armature shaft of the motor, the coil of the brake magnet being shown at 51.

It will be observed from the diagram of Fig. 11 that one side 52 of an electric circuit leads, by way of branch 53, through one side of the switch 47, wire 54, one side of the switch 44, and wire 55, to the armature winding of the motor, shown conventionally at 56. The current passing in a given direction through the winding of the armature, continues through the wire 57; the coil 51 of the brake magnet 50 (see Figs. 10 and 11) wire 58, wire 59, the opposite side of switch 44, wire 60, and through the corresponding side of switch 47 to the other side 61 of the circuit. It will be observed that the main switch 22a is included in that side of the circuit represented by the wire 61. The field winding 62 of the motor is in constant connection with the positive and negative sides of the circuit respectively through the conductors 63 and 64. The foregoing circuit prevails while the head of the machine is traveling downward. After traveling a predetermined distance in this direction the lower end of the rod 42a engages the handle of the switch 44, to open the switch and brake circuits. This results in the de-energization of the motor and brake and the immediate application of the brake, through the action of its spring 50a. The tension of this spring may be adjusted so as to permit the armature shaft to yield to the inertia of the aforesaid head, thereby allowing said head to descend until the rod 42a engages the handle of the switch 48 and closes such switch. Through the connection of the blade of this switch by means of the link 49 with the blade of the upper switch 47, the latter switch will be opened and the circuit is now established through the wire 52, one side of the switch 48, wire 65, one side of the switch 43, wires 66, 58, the coil 51 of the brake magnet and wire 57, to the armature of the motor, the current in this case, entering the armature winding in a reverse direction from that described in connection with the former circuit, leaving the opposite side of the armature winding, the current continues through wire 67, the opposite side of the switch 43, wire 68 and the corresponding side of the switch 48 to the aforesaid wire 61 that constitutes the negative side of the circuit. Remembering that the direction of the flow of current through the field winding of the motor remains constant, it will be seen from the foregoing that the last described circuit results in a reversal of the motor, so that the head of the machine is now caused to ascend to loading position.

With this arrangement, it will be evident that with the switch 22a closed, when the plates are inserted between the forms, the forms will be driven downwardly, current being supplied to the motor until the lower rod or bar 42a strikes the handle of the switch 44. This opens the motor circuit, but the motor continues to run by inertia until the rod or bar 42a closes the switch 48, 48a. Thereupon the motor is reversed and, as the head 13 moves upwardly, the switch 44a may be closed by the spring 46 and the motor will continue to run in this direction, lifting the forms out of the tank, until the rod or bar 42 opens the switch 43. The motor thereupon continues to run by inertia until the rod or bar 42 closes the upper switch 47, 47a. As already explained, the brake 50 may be set so as to vary the speed of the motor and the speed and consequent extent of travel of the form after the motor-energizing circuit is broken.

It will be seen that I thus have two adjustably and automatically operating means for controlling the time wherein the plates are subjected to the action of the quenching liquid. One of these means resides in the adjustability of the lower reversing switch—the farther this switch is from the switch 44 the longer will be the period of immersion. The other means for controlling this period of immersion is the magnetic brake. The more the brake is applied, the longer will be the period consumed by the rod or bar 42ª in traveling from the switch 44 to the switch 48. In the same way, the period for loading and unloading the machine may also be varied by the position of the upper switch 47 relative to the switch 43 and by the magnetic brake. Should the operator desire additional time for the loading or unloading operation, he may suspend the automatic operation as long as he desires by merely opening the main switch 22ª.

In addition to these advantages, there are certain advantages which are due to the manner of clamping the plates during the cambering and quenching operation. It will be noted that the plates are clamped between rigid templets which have the curvature desired to be given to the interposed plates. One of these templets is driven by a continuously operable motor and, but for the springs 16, would strike a blow which might cause the plate to be indented and produce a destructive shock thereupon and therewithin. Furthermore, but for the spring bumper or buffer thus interposed between the motor and the upper templet, the motor, unless otherwise unnecessarily large and powerful, would have to be shut down before impact, in order to avoid burning out. The employment of the spring bumper permits the use of this continuously operable motor and without the necessity for shutting down the same.

The removable counterweights 28 afford a means whereby the plate may be clamped under such pressure, as may be necessary to offset all local stresses due to the bending or cambering of the plate and to retain it in its cambered form. Because of this bending or cambering, the plate must be held clamped while crossing recalescence, and the counterweights enable that pressure to be exerted against the plate which is indicated by the character and gage of steel being treated at any particular time. At the same time, the pressure to which the plate is subjected can be so chosen and regulated that it will be sufficient to permit of the wave-like or snake-like contortions and movements which occur within the plate in evidence of local stresses set up in response to localized differences of temperature within the interval of recalescence, the weights yielding sufficiently to allow these movements to take place. Were the plate clamped rigidly, irregularities or humps would be produced therein and the plate, when quenched, would be non-homogeneous.

Attention has been invited hereinbefore to the fact that oil and water are contained within the tank. This employment of such different quenching liquids and the ability to vary the depths of the different layers thereof are important features of my invention. Considering oil and water as the two liquids most ordinarily employed, subjecting the heated steel to the oil first has the tendency of increasing the tensile strength and the elastic limit of the steel. The steel, thus prepared by the oil, is in condition to withstand the more severe quenching action of the water. But, by preparing the steel for the water-quenching by first subjecting it to the oil-quenching, the steel may be quenched so as to secure most ideal conditions therein. Furthermore, by providing some means for varying the depth or thickness of the oil layer, the time of the oil-quenching operation may be varied, as may be desired, in accordance with the particular grade and gage of steel being treated.

By the apparatus disclosed herein, the period of time that the steel is subjected to the layer of water can be varied by varying the length of the pause of the cambering templets at the bottom of their stroke. The depth of oil may be very easily varied, as by means of a two-way valve 70 in the pipe 39, by operating which the pipes 40 and 41 may be cut out and water be pumped to waste through the pipe 71. The oil can be poured or otherwise suitably introduced into the top of the tank. In like manner, when it is desired to raise the level of the water in the tank, more water may be introduced into the top of the tank.

Passing the plates through the layer of oil into the water therebeneath results in a heat-interchange, mingling the oil and the water to a considerable extent and tending, through such heat-interchange, to maintain these bodies of quenching liquids at temperatures which are the most efficient.

In order to demonstrate the coöperation which exists between the different features of my apparatus and the different steps of my process and a particular grade, width, and gage of steel, I submit the following table which was prepared from the actual treatment of an immense number of spring plates:

(a) Length of plate 36 inches.
(b) Width of plate 1¾ inches.
(c) Gage of plate #3.
(d) Heated to about 1535° prior to cambering.
(e) Counterweight connected to lower table of cambering machine, 2300 pounds.
(f) Weight of lower table of cambering machine, 830 pounds.
(ff) Depth of oil layer 12 inches.
(g) Subjected to oil 3 seconds.
(h) Subjected to water 57 seconds.
(i) Trade name of steel used, Carnegie carbon open hearth steel.

In general, the advantages secured in the operation of my apparatus are:—

(a) Performing the quenching operation at a temperature which will practically eliminate the production of a coarse grain in the steel, due to the ability to quench steel requiring an initial temperature but slightly above recalescence, this end being facilitated by the complete accessibility of the plates to be cambered to the quenching fluid.

(b) Quenching without deformation, secured by the line contacts between the form members and the plates while the plates are prevented from moving laterally by the side guides or grids but are not prevented from elongating and shortening; in other words, the forms do not oppose the irresistible change of shape in the plate during recalescence but limit this change to a change of curvature and length, the plates returning when cold to their original cut lengths.

(c) Quenching without twisting, warping, or undesirable deformation.

(d) Producing tempered plates of uniform quality.

(e) Producing tempered plates of uniform and better quality.

Having thus described my invention, what I claim is:

1. A plate forming device comprising a pair of opposed relatively movable members each member comprising a pair of laterally spaced plates having their edges suitably shaped, a grid at one side of one of the plates of one of said members, and a grid at one side of the opposite plate of the other member.

2. A plate forming device comprising a pair of opposed relatively movable members each member comprising a pair of laterally spaced clamping devices arranged to engage the edge portions of the interposed plate, and grids coöperating with said devices to retain the interposed plate against lateral distortion.

3. In an apparatus of the character described, the combination of a plate forming device comprising laterally spaced clamping members adapted to engage an interposed plate along lines substantially parallel with the length of the plate, and controllable means for discharging a quenching liquid between opposite ends of the clamping plates and longitudinally of the members clamped therebetween.

4. A device of the character described comprising a pair of opposed plate clamping members, each member having a pair of laterally spaced plates each provided with a notched or recessed edge and adapted to engage an interposed plate along lines substantially parallel with the length thereof, and means for moving one of said members toward the other.

5. A device of the character described, comprising a pair of opposed plate clamping members, each member comprising a pair of laterally spaced plates having notched or recessed edges adapted to engage an interposed plate along lines substantially parallel with the length thereof, means for moving one of said members toward the other, and means for supplying quenching liquid in a stream between the clamping plates and lengthwise of the plate clamped therebetween.

6. A device of the character described comprising a pair of opposed plate clamping members, each member consisting of a pair of laterally spaced plates having their edges suitably shaped, one of said members having a center pin interposed between the plates thereof and having on opposite sides of the center adjustable means for engaging the end portions of a plate to be clamped between said members, and means for moving said members toward and from each other.

7. A device of the character described comprising a pair of opposed plate clamping members, each member consisting of a pair of laterally spaced plates having their edges suitably shaped, one of said members having on opposite sides of the center adjustable means for engaging the end portions of a plate to be clamped between said members, and means for moving said members toward and from each other.

8. A device of the character described comprising a pair of opposed plate-clamping members, each member consisting of a pair of laterally spaced plates having their edges suitably shaped, one of said members having a center pin interposed between its plates, shafts extending between the plates of one of said members on opposite sides of the center thereof, and an eccentric on each shaft adapted to be projected beyond the engaging surfaces of said plates thereby to engage and support the ends of the plate which is to be clamped between said members.

9. A device of the character described comprising a pair of opposed plate clamping members, each member consisting of a pair of laterally spaced plates having their edges suitably shaped, and eccentrics mounted between said plates on opposite sides of the center, and means for adjusting said eccentrics.

10. In an apparatus of the character described, the combination of a tank, plate clamping and shaping means mounted in operative relation to said tank, means for reciprocating the plate clamping means whereby a plate clamped thereby may be moved into and out of the liquid in the tank, and means for discharging one or more streams of quenching liquid above the surface of the liquid in the tank and upon the plate which is carried by said clamping means.

11. In an apparatus of the character described, the combination of a tank, a lower clamping member and an upper clamping member arranged to clamp a plate therebetween, means normally supporting the lower member above the level of liquid in the tank, means for moving both of said members and the interposed plate into and out of the liquid in the tank, a pump connected with said tank, and connections whereby said pump may discharge liquid from the tank to opposite sides of the tank in streams extending lengthwise of the clamping members and the interposed plate and at points below the position which the clamping surface of the lower member normally occupies.

12. In an apparatus of the character described, the combination of a lower clamping member and an upper clamping member arranged to clamp a plate therebetween, means for reciprocating both of said members and the interposed plate, and means for discharging quenching liquid in one or more streams extending lengthwise of the clamping members and the interposed plate and below the position which the clamping surface of the lower clamping member normally occupies.

13. In an apparatus of the character described, the combination of a tank having quenching liquid therein consisting of water in the lower part thereof and oil on top of said water, a pump connected with the lower portion of the tank and adapted to discharge streams of liquid through opposed portions of the tank and above the level of the oil therein, plate clamping and shaping means arranged normally above the paths of said streams and having means for moving a plate in substantially the vertical plane of said streams, and means for reciprocating said clamping and shaping means through said streams.

14. In an apparatus of the character described, the combination of a tank having quenching liquid therein consisting of water in the lower part thereof and oil on top of said water, a pump connected with the lower portion of the tank and adapted to discharge streams of liquid through opposed portions of the tank, plate clamping and shaping means arranged normally above the paths of said streams and having means for moving a plate in substantially the vertical plane of said streams, and means for reciprocating said clamping and shaping means through said streams and through the oil and water in the tank.

15. In an apparatus of the character described, the combination of plate clamping and forming means, quenching means, means for securing relative movement between the plate clamping and forming means and said quenching means whereby a plate may be brought into and out of operative relation to such quenching means, and means operative through the relative movement between the plate clamping and forming means and the quenching means for automatically controlling the duration of the quenching period to which the plate is subjected.

16. In an apparatus of the character described, the combination of plate clamping and forming means, a quenching tank, means for immersing a plate clamped by said means in the liquid in said tank, means operative by the immersing movement for automatically controlling the period of immersion of the plate in the liquid in the tank, and means whereby such quenching period may be varied.

17. In an apparatus of the character described, the combination of plate clamping and forming means, a quenching tank, means for moving the plate clamping and forming means thereby to immerse the same and a plate clamped thereby in the liquid in the tank, and means dependent upon the depth of immersion of the plate forming and clamping means in the liquid for automatically reversing the movement of said plate clamping and forming means.

18. In an apparatus of the character described, the combination of a pair of clamping and forming members adapted to receive a plate therebetween, means normally holding said members separated, a tank for quenching liquid, a motor connected to one of said members to move the same toward and from the other and to cause both members and the plate clamped therebetween to be moved into and out of the liquid in the tank, and adjustable means for automatically reversing the motor when the member connected thereto shall have been moved a predetermined distance in either direction.

19. In an apparatus of the character described, the combination of a pair of clamping and forming members adapted to receive a plate therebetween, means normally holding said members separated, a tank for quenching liquid, a motor connected to one of said members to cause the members and the plate clamped therebetween to move into and out of the liquid in the tank, and adjustable means for automatically reversing the motor when the member connected thereto shall have been moved a predetermined distance.

20. In an apparatus of the character described, the combination of a plate clamping and forming device, a motor connected thereto, quenching means arranged in the path of movement of said device, and adjustable means, operative by the movements of said device, for automatically driving said motor in reverse directions, whereby the quenching period corresponding to each adjusted position of the last mentioned means may be predetermined.

21. In an apparatus of the character described, the combination of a plate forming device, an electric motor connected thereto, quenching means arranged in the path of movement of said member, means for automatically opening the motor circuit when the said device shall have been moved a predetermined distance toward the quenching means, means for automatically reversing the said motor, and means for automatically reversing the motor when the said device shall have been moved a predetermined distance away from the quenching means.

22. In an apparatus of the character described, the combination of a plate forming device, an electric motor connected thereto, quenching means arranged in the path of movement of said member, means for automatically opening the motor circuit when the said device shall have been moved a predetermined distance into the quenching means, means for thereafter automatically reversing the said motor, means for automatically opening the circuit when the said device shall have been moved a predetermined distance away from the quenching means, and means for thereafter automatically reversing the motor.

23. In an apparatus of the character described, the combination of a pair of clamping and forming members adapted to receive a plate therebetween, a tank for quenching liquid, an electric motor connected to one of said members to move the same toward and from the other and to move both members and the plate clamped therebetween into the liquid in the tank, means for automatically opening the motor circuit when said members have been moved a predetermined distance into the liquid in said tank, means for thereafter automatically reversing said motor, means for moving the member which is opposed to the motor-driven member out of the quenching liquid, means for automatically opening the motor circuit when the member to which it is connected has been moved a predetermined distance in such reverse direction, and means for thereafter automatically closing the motor circuit for again operating the member connected thereto toward the quenching liquid.

24. In an apparatus of the character described, the combination of an upper and a lower plate-forming and clamping member, a tank therebeneath, an electric motor, a driving connection between said motor and the upper member, means for automatically opening the motor circuit when the member operated thereby has been moved a predetermined distance in relation to the liquid in the tank, means for thereafter automatically closing and reversing the motor circuit, means for automatically opening the motor circuit when the member driven thereby has been moved a predetermined distance in the reverse direction, means for automatically closing the said circuit to operate the motor in its original direction when the said member shall have been moved a predetermined distance beyond that when the said circuit was last opened, and means for moving the lower member from the liquid in said tank.

25. In an apparatus of the character described, the combination of an upper and a lower plate clamping and forming member, a tank for quenching liquid beneath the lower of said members, means tending to lift the lower member out of the quenching liquid, an electric motor, a driving connection between said motor and the upper member, an electric circuit including said motor, a brake for said motor, means for automatically opening the motor circuit and for applying the brake when the said members shall have been moved a predetermined distance into the quenching liquid, means for automatically reversing the circuit and for releasing the brake when the said members shall have been moved a predetermined farther distance into such quenching liquid, means for automatically opening said circuit and for applying said brake when the member driven by the motor shall have been moved a predetermined distance out of said liquid, means for automatically releasing the brake when the member shall have moved a predetermined farther distance away from the liquid, and a manually controlled switch for said circuit.

26. In an apparatus of the character described, the combination of an upper and a lower plate clamping and forming member, a liquid containing tank, means connected with the lower member and tending to move the same away from the liquid in the tank, an electric motor, a driving connection between said motor and the upper member, a switch in the motor circuit adapted to be opened when the upper member shall have traveled a predetermined distance in its downward movement, a motor-reversing switch adapted and arranged to be closed when the said member shall have moved a predetermined farther distance in its downward movement, a switch in the motor circuit adapted to be opened when the said upper member shall have moved a predetermined distance in its upward movement, a second reversing switch arranged to be closed when the said upper member shall have been moved a predetermined farther distance in its upward movement, a connection between the first and third switches whereby the opening of one will automatically close the other, and a connection between the second and fourth switches whereby the opening of one will automatically close the other.

27. In an apparatus of the character described, the combination of an upper and a lower plate clamping and forming member, a liquid containing tank, means connected with the lower member and tending to move the same away from the liquid in the tank, an electric motor, a driving connection between said motor and the upper member, a switch in the motor circuit adapted to be opened when the upper member shall have traveled a predetermined distance in its downward movement, a motor-reversing switch adapted and arranged to be closed when the said member shall have moved a predetermined farther distance in its downward movement, a switch in the motor circuit adapted to be opened when the said upper member shall have moved a predetermined distance in its upward movement, a second reversing switch arranged to be closed when the said member shall have been moved a predetermined farther distance in its upward movement, a connection between the first and third switches whereby the opening of one will automatically close the other, a connection between the second and fourth switches whereby the opening of one will close the other, and means whereby the distance between the first and second switches and between the third and fourth switches may be varied, thereby to vary the period of time intervening between the opening of the first switch and the closing of the second switch and between the opening of the third switch and the closing of the fourth switch.

28. In an apparatus of the character described, the combination of a pair of clamping and forming members adapted to receive a plate therebetween, an electric motor connected to one of said members to move the same toward and from the other and to cause both of said members and the plate clamped therebetween to be moved into and out of a quenching liquid, means for automatically opening the motor circuit when said members have been subjected for a predetermined time to the action of such quenching liquid, means for thereafter automatically reversing said motor, means for automatically opening the motor circuit when the member to which it is connected has been moved a predetermined distance in such reverse direction, and means for thereafter automatically closing the motor circuit for again operating the member connected thereto toward the quenching liquid.

29. In an apparatus of the character described, the combination of a plate forming member, a quenching-liquid member, an electric motor, a driving connection between said motor and one of said members whereby the plate forming member may be brought into operative relation to the quenching-liquid member, means for automatically opening the motor circuit when the member operated thereby has been moved a predetermined distance, means for thereafter closing and reversing the motor circuit, means for automatically opening the motor circuit when the member driven thereby has been moved a predetermined distance in the reverse direction, and means for closing the said circuit to operate the motor in its original direction when the said member shall have been moved a predetermined distance beyond that occupied by it when the said circuit was last opened.

30. In an apparatus of the character described, the combination of a plate forming member, a quenching-liquid member, means for moving one of said members toward the other whereby the plate-forming member will be placed in operative relation to the quenching-liquid member, means for automatically breaking the driving connection between the driven member and its operating means, and means for thereafter automatically moving said driven member in the reverse direction, whereby a plate carried by the first mentioned member may be subjected to the action of quenching liquid for a period of time determinable by the breaking of the driving connection and the movement of such member in the reverse direction.

31. In an apparatus of the character described, the combination of a plate forming member, a quenching-liquid member, means connected with one of said members whereby the plate-forming member will be placed in operative relation to the quenching-liquid member, means for automatically breaking the driving connection between the driven member and its operating means, means for thereafter operating the driven member in the reverse direction, and means for thereafter automatically breaking the driving connection between the driven member and its operating means.

In testimony whereof, I hereunto affix my signature in the presence of two witnesses.

THOMAS J. FAY.

Witnesses:
BRENNAN B. WEST,
CHAS. E. BROCK.